Figure 1:
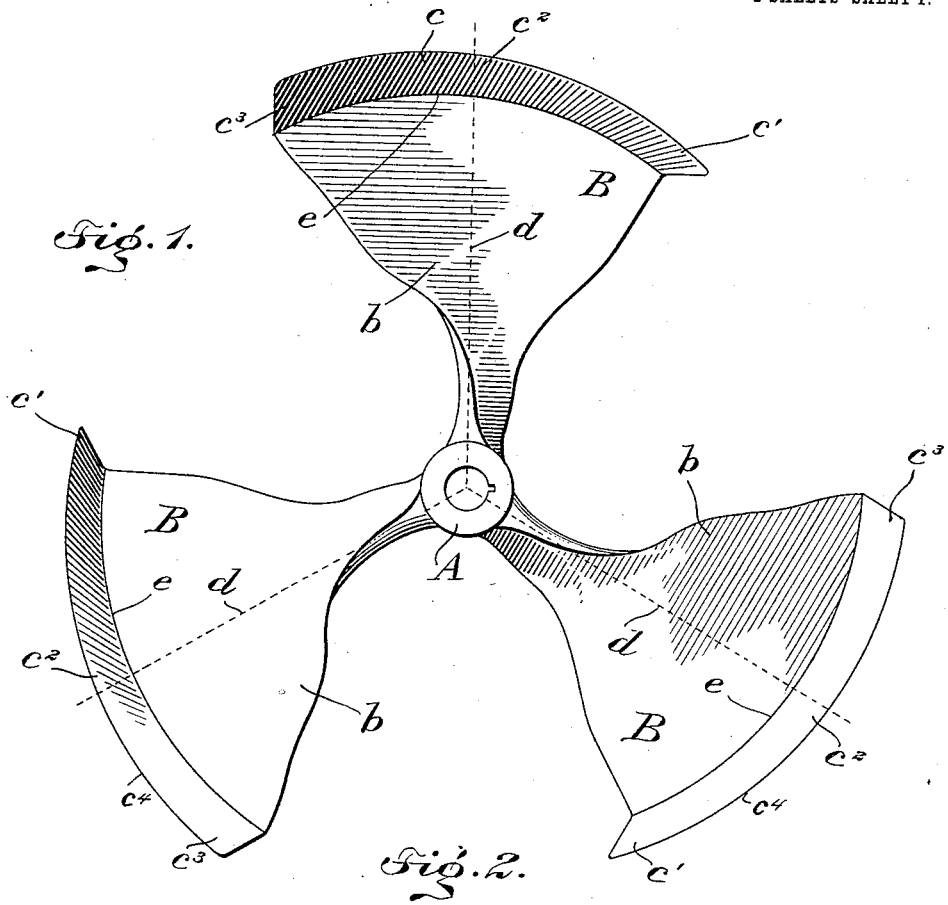

J. R. TYSON.
MARINE PROPELLER.
APPLICATION FILED NOV. 19, 1906.

1,041,912.

Patented Oct. 22, 1912.
2 SHEETS—SHEET 1.

WITNESSES
H. C. Abbott
V. E. Nichols

INVENTOR
James R. Tyson
BY Griffins Bernhard
ATTORNEYS

J. R. TYSON.
MARINE PROPELLER.
APPLICATION FILED NOV. 19, 1906.
1,041,912.
Patented Oct. 22, 1912.
2 SHEETS—SHEET 2.
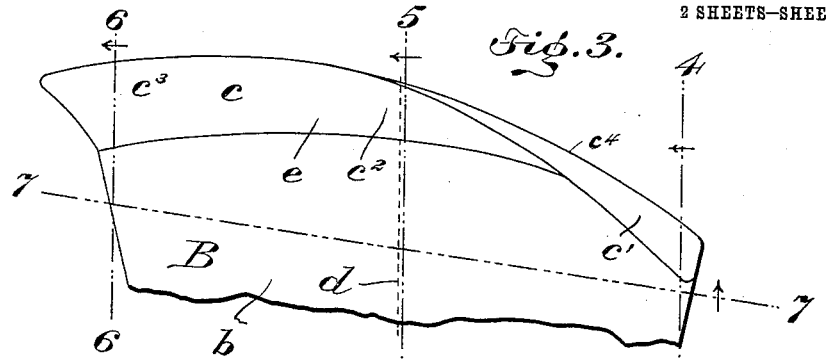
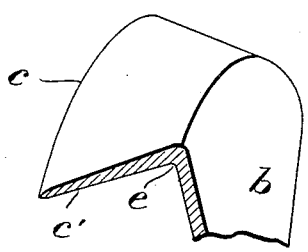
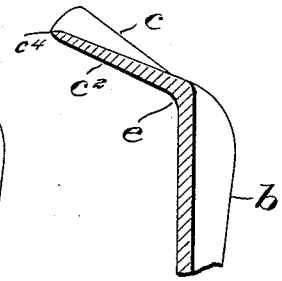
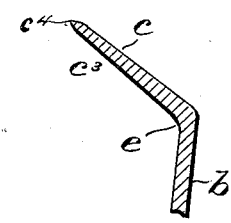
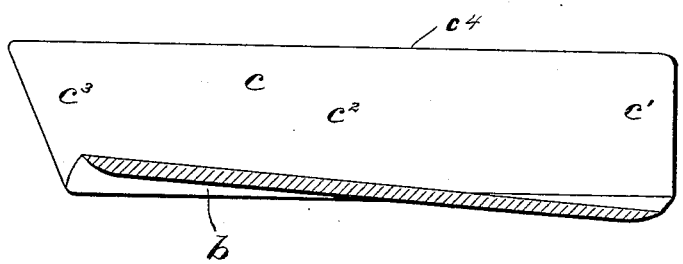
WITNESSES
INVENTOR
James R. Tyson
BY Griffin & Bernhard
ATTORNEYS

UNITED STATES PATENT OFFICE.

JAMES R. TYSON, OF READING, PENNSYLVANIA.

MARINE PROPELLER.

1,041,912.  Specification of Letters Patent.  Patented Oct. 22, 1912.

Application filed November 19, 1906. Serial No. 343,965.

*To all whom it may concern:*

Be it known that I, JAMES R. TYSON, a citizen of the United States, residing in the city of Reading, county of Berks, and State of Pennsylvania, have invented a certain new and useful Marine Propeller, of which the following is a specification.

This invention appertains to propellers for marine vessels, and the object in view is to provide a new construction which minimizes the "slip" of ordinary screws, whereby I am enabled to substantially increase the efficiency of the propeller and materially increase the speed of the vessel.

According to the present invention the propeller is constructed with a plurality of compound blades. Each blade is a compound screw, and comprises two members, one of which is a helix extending in a generally radial direction from the hub, and the other is a helix arranged at the periphery of the aforesaid member. The second named member of the compound screw blade overhangs the first named member of the blade, and while both members of each blade coöperate in the performance of the work of propelling the vessel, the second named member of each blade performs the important function of overcoming the tendency of the water to fly outward under the centrifugal action of the rotating propeller. The compound screws formed by the plurality of blades constituting the new structure largely increase the area of the propelling surface, and the screws of the respective blades are arranged so as to both operate on the water and in a manner to effectually overcome the radial movement of the water, and the consequent "slip" of the screw. In view of the fact that the slip is minimized, I am able to set each radial blade member at a much greater angle to the axis of the hub than is possible in the blades of ordinary screws, whereby the efficiency of the propeller may be increased, and this is augmented by the addition of the peripheral members which are screws or helices of themselves. Furthermore, the spiral peripheral members are so peculiarly disposed that while they confine the water within the periphery of the propeller, the water is enabled to escape from the zone of the propeller without hindrance, the effect of the compound screws being to send the water in a solid column dead astern of the vessel.

I have illustrated a practical embodiment of the invention in the accompanying drawings, but it is to be understood that said drawings do not define the limits of the invention, but are illustrative only thereof.

Figure 2:
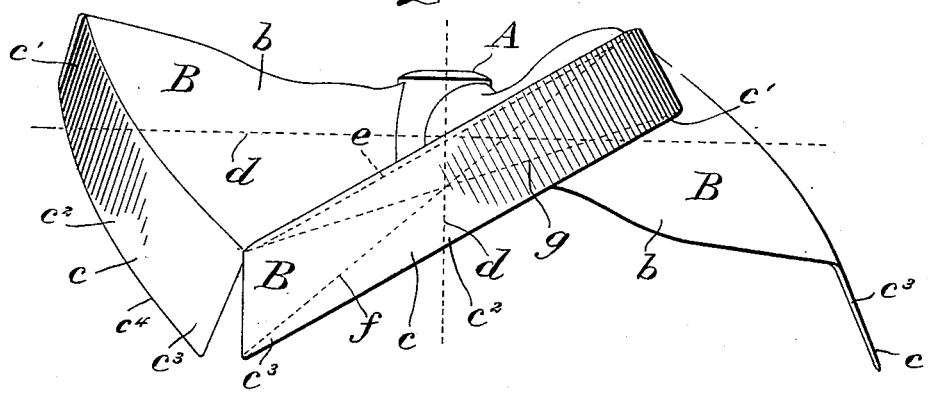

Figure 1 is a front elevation of the new compound screw propeller; Fig. 2 is a plan or edge view thereof; Fig. 3 is an enlarged detail view of one of the blades; Figs. 4, 5, and 6 are cross sections on the lines 4—4, 5—5 and 6—6 respectively of Fig. 3; and Fig. 7 is a section on the line 7—7 of Fig. 3.

A designates the hub and B the blades of a propeller constructed in accordance with this invention. As shown by Figs. 1 and 2, the propeller has a series of three blades set equi-distantly from each other, but it is to be understood that the number of blades is not material, for the reason that the blades may be decreased or increased as may be desired or found necessary. Each blade B consists of members $b$, $c$, each in the form of a section of a screw and so arranged with relation one to the other as to produce a compound screw for the double purpose of minimizing the slip and of increasing the effective area of the propelling surface. The member $b$ of each blade extends outwardly from the hub in a generally radial direction, but it is to be noted at this point that there are two features or elemental factors which are peculiar to this new form of propeller; first, the member is twisted at a much greater angle to the axis of the hub than in ordinary propellers, and, second, the axial line $d$ of the blade intersects an edge of the blade, as is clearly evident by an inspection of Fig. 1. The member $b$ of each blade enlarges from the hub outwardly, and in cross section the blade presents a section of a helix or screw, as shown by Fig. 7, the working surface of the aforesaid member $b$ increasing in area toward the periphery of the blade. Furthermore, the widest portion of the member $b$ is at the periphery thereof, and, further, the edge $e$ is diagonal to the axis of the hub, see the dotted line $e$ in Fig. 2.

Speaking generally, the peripheral member $c$ of each blade is in overhanging relation to the working or active propelling surface of the member $b$. This member $c$, however, is an important element of the new propeller, for the reason that it limits or confines the centrifugal motion of the water acted on by the member $b$; it constitutes a supplemental or auxiliary propelling surface, and while confining the water it is fashioned to permit the escape rearwardly of the water in a solid column directly in the wake of the vessel. The member $c$ is in the form of a wide rib or fin at the periphery of the member $b$, the length of said member $c$ being co-extensive with the peripheral eccentric edge $e$ of the aforesaid member $b$. This peripheral member $c$ of each propeller blade is in itself a screw or helix, the latter beginning at the front end of the member $c$ and twisting or flaring to the helical or screw formation toward the heel or rear portion of the blade, as graphically represented by the comparative views Figs. 4 to 6 inclusive. The front end portion $c'$ of the peripheral member $c$ is concentric with the axis of the hub A, said portion $c'$ being at a right angle to the active face of the member $b$, see Fig. 4. From a point about one fourth the length of the member $c$, it is gradually turned outwardly, flared or inclined as at $c^2$ $c^3$ in Figs. 3, 5 and 6, the greatest portion of the flare being at the heel or rear part of the member $c$. This formation of the member $c$ gives a screw or helical contour thereto, the free edge $c^4$ and the faces of the member being spirals which begin at the front end and terminate at the rear; in other words, the member $c$ may be said to combine a section of a cylinder and a section of a cone.

The screw formations of the members $b$, $c$, are singularly harmonious in my propeller for the reason that the spiral of the member $c$ finds a complement in the cross sectional form of the member $c$ along the line 7—7, of Fig. 3, as clearly shown in Fig. 7. Another peculiarity of my propeller is that the spiral member $c$ is uniform in width from end to end, or substantially so. The member $c$ is laid down or plotted with mathematical accuracy for the reason that the diagonals $f$, $g$, (see Fig. 2) running from opposite corners of the member $c$ bisect the radial axial line $d$ of the member $b$.

An important advantage secured by my new construction of the blade is that the members $b$, $c$, mutually strengthen one another, for the reason that said members constitute an arch or truss wherein the member $c$ overcomes any tendency of the member $b$ to spring out of place under the resistance of the water when the propeller is rotating at a high speed.

It should be noted that the edges of the members $b$, $c$, are tapered almost to cutting edges, and that the surfaces of the blades are smoothed and polished.

With the propeller rotating at high speed, the members $b$ act on the water in a manner to force it radially, but the members $c$ limit this radial movement and condense the water, as it were, said members $c$ acting on the water to force it rearwardly. The helical formation of the members $b$, $c$, causes the propeller to act on the water in such a peculiar manner as not only to minimize the slip of the propeller but to substantially increase the efficiency of the said propeller, as shown by actual tests, and to send the water in a solid column rearwardly from the vessel. The water passes out and back unrestrainedly for the reason that the rearward flare of the members $c$ permit such escape of the water; besides, the blades are spaced to secure the admission of such a volume of water between the blades as can be operated upon to the best advantage. The propeller can rotate up to the full capacity and speed of the engine; and in view of the facts that the slip of the propeller is minimized and the active surface is augmented, I have produced such a construction which utilizes the full energy of the engine and of the compound screw, with the result that the speed of the vessel is appreciably increased.

While I have shown and described my propeller as especially adapted for the propulsion of marine vessels, it is manifest that the principle of the invention may be utilized in the construction of fluid drive wheels generally and in the construction of propellers adapted for other than marine crafts.

Having thus described my invention, what I claim as new, and desire to secure by Letters Patent is:—

1. In a propeller, a compound screw blade comprising a substantially radial member and a rim constituting a peripheral propelling member, said rim being at an angle to the face of the radial member, and said angular relation of the rim increasing toward the rear end of the radial member.

2. In a propeller, a compound screw blade comprising a substantially radial screw member, and a peripheral screw rim overhanging the working surface of said radial member, the angular relation of the rim to the radial member increasing toward the rear edges of said radial member and rim.

3. In a drive wheel, a compound screw blade comprising a screw member extending outwardly from a hub and a helical rim overhanging the working face of said screw member, one edge of said rim following the contour of the peripheral edge of the screw blade and said rim being inclined outwardly from the face of the blade.

4. A drive wheel comprising screw blades extending outwardly from a hub, and helical rims, one on each blade, positioned to overhang the working face of said blade, each rim being oblique for a part of its length to said working face and the rear part of said rim being at a different angle than the angle of the rim of the working face at the front part of said rim.

5. A drive wheel comprising screw blades extending outwardly from a hub, and rims, one on each blade, positioned to overhang the working face thereof, each rim being a helix the axis of which is different from the axis of the screw blade, said rims being inclined relative to the working faces of said blades.

6. A drive wheel comprising screw blades and helical rims, each rim overhanging a working face of one blade and the axis of each rim being different from the axis of the screw blade, each rim being inclined relative to the working face of the blade, and the angle of inclination increasing toward the rear end of said blade.

7. A drive wheel embodying screw blades extending outwardly from a hub and screw rims overhanging the working faces of said screw blades, each rim being positioned for a part of its length at an obtuse angle to the working face of said blade.

8. A propeller comprising screw blades extending outwardly from a hub, and a rim overhanging a working face of each blade, each rim being twisted substantially from one end portion to the other and said rim flaring outwardly and backwardly relative to the working face of the blade.

9. A propeller comprising screw blades extending outwardly from a hub, and spiral rims on said blades, and overhanging a working face thereof, each rim being positioned at an angle to said face of the blade, and the angle of inclination of said rim increasing toward the back edge of the blade.

10. In a drive wheel, a compound screw member comprising a screw blade and a helical rim projecting from a peripheral edge, and overhanging a working face of said screw blade, the center of the helical rim being in the plane of an axial radial line through the screw blade.

11. A propeller having screw blades extending outwardly from a hub and each set at an angle between 20 and 45 degrees to the axis of said hub, and a spiral rim positioned to overhang a working face of each blade, said rim flaring outwardly from the blade, and the angle of inclination of the rim increasing toward the rear edge of the blade.

12. A propeller having screw blades extending outwardly from a hub and each set at an angle between 20 and 45 degrees to the axis of said hub, the widest part of the blade being at the periphery thereof, and a spiral rim following the contour of the periphery of each blade, said rim flaring outwardly from the working face of the blade, and the angle of inclination of said rim relative to the face of the blade increasing toward the rear edge of said blade.

13. In a drive wheel, a hub, a plurality of screw blades each extending in a general radial direction therefrom, each blade increasing in width outwardly from the hub, and a helical rim positioned substantially at the periphery of each blade, said rim overhanging the working face of the blade and positioned obliquely thereto.

14. In a drive wheel, a compound screw blade comprising a substantially radial member, and a helical peripheral rim, said peripheral rim being oblique for a part of its length to the working face of said radial member and the relative angle of the peripheral rim to the radial member increasing substantially toward the rear edge of the radial member.

15. In a drive wheel, a hub, a plurality of screw blades each set at an angle exceeding 25 degrees to the axis of the hub, and a helical peripheral rim on each screw blade and overhanging a working face thereof, the relative angle of the peripheral rim to the working face of the screw blade increasing substantially from one end toward the other of said peripheral rim.

16. A drive wheel consisting of a plurality of screw blades and a rim or wing on each blade, each rim being inclined at different portions thereof at different angles to the surface of the blade, and said rim having an inner helical face constituting a propelling surface.

17. A drive wheel comprising a plurality of compound screw blades adapted to limit the centrifugal motion of the fluid, each compound blade being composed of a substantially radial member and a rim, the angle of said rim to the face of the radial member increasing toward the heel of the blade.

18. In a drive wheel, a screw blade, and a substantially helical wing thereon, the axis of generation of said wing being at a right angle to a radial medial line of the blade, the under surface of said wing being inclined with relation to a working surface of said blade.

In testimony whereof I have signed my name to this specification, in the presence of two subscribing witnesses.

JAMES R. TYSON.

Witnesses:
H. I. BERNHARD,
V. E. NICHOLS.